United States Patent
Shinozaki

(10) Patent No.: US 9,616,545 B2
(45) Date of Patent: Apr. 11, 2017

(54) EXHAUST FLOW RATE CONTROL APPARATUS AND SUBSTRATE PROCESSING APPARATUS PROVIDED THEREWITH

(71) Applicant: Ebara Corporation, Tokyo (JP)

(72) Inventor: Hiroyuki Shinozaki, Tokyo (JP)

(73) Assignee: Ebara Corporation, Tokyo (JP)

( * ) Notice: Subject to any disclaimer, the term of this patent is extended or adjusted under 35 U.S.C. 154(b) by 130 days.

(21) Appl. No.: 14/496,411

(22) Filed: Sep. 25, 2014

(65) Prior Publication Data

US 2015/0090351 A1    Apr. 2, 2015

(30) Foreign Application Priority Data

Oct. 2, 2013   (JP) ................. 2013-207143

(51) Int. Cl.
*F02C 9/26* (2006.01)
*B24B 37/015* (2012.01)
*G05D 23/19* (2006.01)

(52) U.S. Cl.
CPC ....... *B24B 37/015* (2013.01); *G05D 23/1917* (2013.01); *Y10T 137/7737* (2015.04)

(58) Field of Classification Search
CPC ....... B24B 37/015; B24B 49/14; B24B 55/06; G05D 23/1917; Y10T 137/7737
USPC ............................................. 137/468; 451/7
See application file for complete search history.

(56) References Cited

U.S. PATENT DOCUMENTS 6,889,763 B1 * 5/2005 Subramanian ............ F25B 9/02
                                                   165/244
2010/0144249 A1    6/2010 Kitagawa et al.

FOREIGN PATENT DOCUMENTS

| JP | 09-123057 A | 5/1997 |
|----|-------------|--------|
| JP | H09-148231 A | 6/1997 |
| JP | H11-188613 A | 7/1999 |
| JP | 2008-207282 A | 9/2008 |
| JP | 2012-139739 A | 7/2012 |
| JP | 2013-022664 A | 2/2013 |

* cited by examiner

*Primary Examiner* — Kevin Lee
*Assistant Examiner* — P. Macadenichols
(74) *Attorney, Agent, or Firm* — Leydig, Voit & Mayer, Ltd.

(57) ABSTRACT

The present invention is intended to set the temperature of a predetermined location inside a processing space in which a polishing pad is disposed to within a predetermined temperature range. A substrate processing apparatus includes a CMP apparatus and an exhaust flow rate control apparatus configured to exhaust a polishing space in which the CMP apparatus is disposed. The exhaust flow rate control apparatus is provided with a first exhaust line, a first exhaust flow rate-variable device and an exhaust control unit. The exhaust control unit includes a storage device storing control data on previously-calculated exhaust flow rates necessary to set the temperature of a predetermined location of the CMP apparatus.

7 Claims, 6 Drawing Sheets

EXHAUST FLOW RATE CONTROL APPARATUS AND SUBSTRATE PROCESSING APPARATUS PROVIDED THEREWITH

FIELD OF THE INVENTION

This application claims the right and benefit of priority of Japanese Patent Application No. 2013-207143, filed on Oct. 2, 2013, the entire content of which is incorporated herein by reference.

The present invention relates to an apparatus for controlling the exhaust flow rate of a processing space in a substrate processing apparatus, such as a CMP (Chemical Mechanical Polishing) apparatus, and a substrate processing apparatus provided with this apparatus.

BACKGROUND ART

Conventionally, a CMP apparatus used in a process for manufacturing semiconductor integrated circuit devices has been configured to polish a surface of a semiconductor wafer to be polished by, for example, pressing a semiconductor wafer (object being polished) held on the lower surface of a top ring to which a rotative force is given by a rotational axis supported on an arm against a surface of a polishing pad mounted on a polishing table to which a rotative force is given by a rotational axis, while feeding a polishing liquid to the surface.

In this type of CMP apparatus, frictional heat generated due to friction between the polishing surface and the wafer rises, if a process of raising the pressure of the polishing surface of the polishing pad, a process of raising the relative velocity between the polishing surface and the semiconductor wafer, or the like is performed when the semiconductor wafer is being polished, in order to increase a polishing rate. Thus, the temperature of the polishing surface and the polishing liquid (slurry) spreading across the polishing surface rises. Along with this temperature rise in the polishing surface and the slurry, a temperature rise is also caused in the semiconductor wafer in contact with the polishing pad and the slurry and in the top ring holding the semiconductor wafer.

The temperature rise in the polishing surface of the polishing pad degrades the hardness and Young' modulus of the polishing pad and may cause a degradation in the degree of planarity of the surface of the semiconductor wafer being polished which is an object to be polished. If the temperature of the slurry rises, the polishing rate can be expected to increase for reasons of the chemical performance of the slurry. If the temperature rises excessively, however, the properties of the slurry degrade. The slurry thus may fail to deliver its intrinsic polishing performance. In addition, any significant rise in the temperature of the top ring holding the wafer affects a mechanism for pressing the wafer against the polishing pad. Accordingly, there is the desire to be able to manage and control these temperature rises due to polishing.

Hence, it is known that a cooling plate is placed in contact with the polishing surface of the polishing pad to remove heat therefrom by means of thermal conduction (see, for example, Japanese Patent Laid-Open No. H9-123057). In this cooling by a thermal contact conductance method, however, the cooling plate has contact with the polishing pad and the slurry. Accordingly, there arises the need for devices for coating and cleaning a surface of the cooling plate to be brought into contact with the polishing pad, in order to prevent contamination resulting from the cooling plate (contamination by ions and particles). In addition, if slurry particles generated as the result of the slurry adherent to the cooling plate being dried drop from the cooling plate onto the upper surface of the polishing pad, these slurry particles may be caught between the polishing surface of polishing pad and the polished surface of the wafer during wafer polishing and cause damage to the polishing and polished surfaces. Thus, there arises the need for a device for cleaning the cooling plate as a whole.

Yet additionally, since a heat removal effect in a thermal contact conductance method is proportional to the contact area of the cooling plate and the temperature difference between the cooling plate and the polishing pad (or the slurry), the contact area and the temperature difference have to be large. It is not easy to secure such a contact area, however, since a top ring holding the wafer, a dresser for dressing the pad, a slurry nozzle for feeding the slurry, an atomizer nozzle (high-pressure pure water shower nozzle) for cleaning a pad surface, and the like are disposed above the surface of the polishing pad.

Hence, it is known that the latent heat of vaporization is removed by spraying a dry gas (air or nitrogen) onto the surface of the polishing pad wetted with slurry and the like (see, for example, Japanese Patent Laid-Open Nos. 2012-139739 and 2013-22664). If a dry gas is sprayed onto the surface of the polishing pad, however, the slurry splashes due to the dry gas thus sprayed and the amount of slurry components effective for polishing decreases. Another problem is that the splashed slurry attaches to locations around a CMP apparatus and the slurry thus attached drops to cause a scratch problem in wafer surfaces. This method is therefore inferior in general versatility and is narrow in the range of application.

Hence, the present inventors have paid attention to a spatial exhaust flow rate in a space of polishing treatment, particularly in the vicinity of the polishing surface of the polishing pad. Thus, the present inventors have conceived of being able to manage and control the amount of latent vaporization heat released from the surface of the polishing pad, the slurry, and the surface of the top ring and, thereby, manage and control a temperature rise in the polishing pad and the like by managing and controlling the exhaust flow rate.

That is, an object of the present invention, which has been accomplished in view of the above-described problems, is to set the temperature of a predetermined location inside a processing space in which a polishing pad and the like are disposed to within a predetermined temperature range, for example, a temperature range in which a polishing rate is maximum.

SUMMARY OF INVENTION

In order to achieve the above-described object, an exhaust flow rate control apparatus according to one aspect of the present invention is provided with an exhaust device configured to be capable of exhausting a processing space in which a substrate processing apparatus is disposed; a first exhaust flow rate-variable device capable of adjusting the flow rate of exhaust from the processing space; and a control device configured to be capable of controlling the first exhaust flow rate-variable device, so that the temperature of a predetermined location inside the processing space falls within a predetermined temperature range.

The exhaust flow rate control apparatus according to another aspect of the present invention is provided with a temperature-measuring device for measuring the temperature of the predetermined location inside the processing space, wherein the control device calculates an exhaust flow rate necessary for the temperature of the predetermined location inside the processing space to fall within the predetermined temperature range on the basis of the measured temperature, and controls the first exhaust flow rate-variable device to achieve the calculated exhaust flow rate.

The exhaust flow rate control apparatus according to yet another aspect of the present invention is provided with a flow rate-measuring device for measuring the flow rate of exhaust from the processing space, wherein the control device controls the first exhaust flow rate-variable device on the basis of the measured exhaust flow rate to achieve the calculated exhaust flow rate.

The exhaust flow rate control apparatus according to still another aspect of the present invention is configured such that the control device includes a storage device storing control data on previously-calculated exhaust flow rates necessary for the temperature of the predetermined location to fall within the predetermined temperature range, and controls the first exhaust flow rate-variable device on the basis of the control data.

The exhaust flow rate control apparatus according to still another aspect of the present invention is provided with a second exhaust flow rate-variable device capable of adjusting the flow rate of exhaust from a space other than the processing space, wherein the exhaust device is configured to be capable of exhausting the other space and controls the first exhaust flow rate-variable device and the second exhaust flow rate-variable device, so that the sum of the flow rate of exhaust from the processing space and the flow rate of exhaust from the other space is constant.

In order to achieve the above-described object, a substrate processing apparatus according to one aspect of the present invention is provided with one of the above-described exhaust flow rate control apparatuses.

According to the present invention, the inner temperature of the polishing space falls within the predetermined temperature range, and therefore, it is possible to prevent the degradation of the polishing pad, the top ring and the like and keep a polishing rate constant.

DESCRIPTION OF EMBODIMENTS

Figure 1:
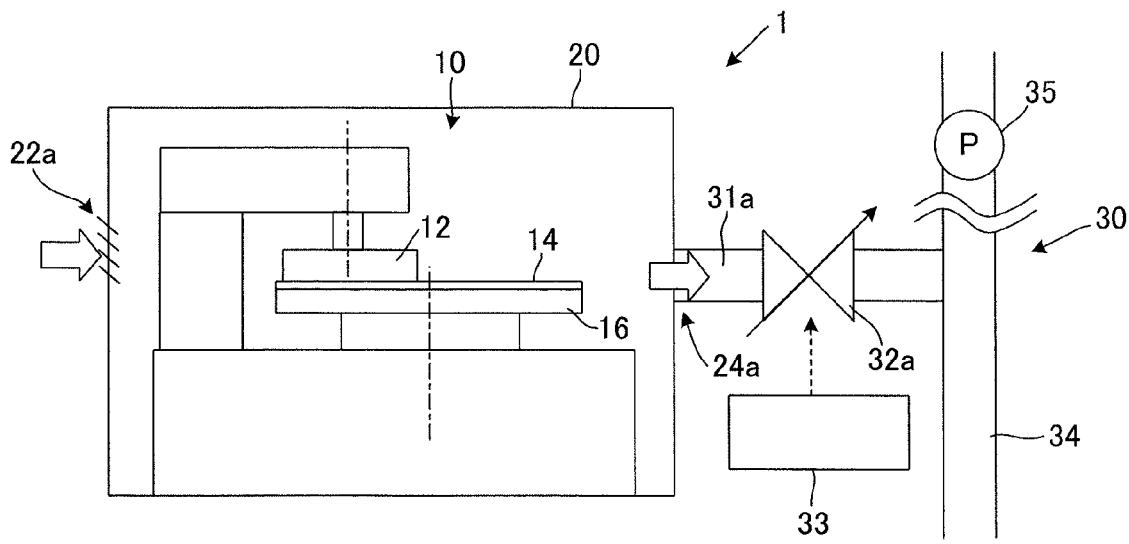
FIG. 1 is a schematic view illustrating an exhaust flow rate control apparatus and a substrate processing apparatus provided therewith.

Hereinafter, embodiments of the present invention will be described with reference to the accompanying drawings. In the drawings to be described hereinafter, constituent elements identical or corresponding to one another are denoted by like reference numerals and characters and will not be discussed again.

FIG. 1 is a schematic view illustrating an exhaust flow rate control apparatus according to the present embodiment and a substrate processing apparatus (CMP apparatus) provided therewith.

As illustrated in the figure, a substrate processing apparatus 1 according to the present embodiment includes a CMP apparatus 10 provided with a top ring 12 for holding a substrate, such as a wafer, and a polishing table 16 to which a polishing pad 14 is attached; and an exhaust flow rate control apparatus 30 configured to be capable of exhausting a polishing space 20 (processing space) in which the CMP apparatus 10 is disposed.

The exhaust flow rate control apparatus 30 is provided with a first exhaust line 31a connected to an outlet 24a of the polishing space 20; a first exhaust flow rate-variable device 32a capable of adjusting the flow rate of exhaust from the polishing space 20 in the first exhaust line 31a and composed of an exhaust damper and the like; an exhaust control unit 33 to control the first exhaust flow rate-variable device 32a; a factory exhaust line 34 connected to the first exhaust line 31a; and an exhaust device 35 configured to be capable of exhausting the polishing space 20 through the first exhaust line 31a. An inlet 22a is arranged in the polishing space 20 and the polishing space 20 is ventilated as the result of the polishing space 20 being exhausted from the outlet 24a and air being drawn in from the inlet 22a.

The exhaust control unit 33 is configured to be capable of communicating with the first exhaust flow rate-variable device 32a. In addition, the exhaust control unit 33 includes a storage device storing control data on previously-calculated exhaust flow rates necessary for the temperature of a predetermined location of the CMP apparatus 10, for example, a surface of the polishing pad 14 to fall within a predetermined temperature range, and controls the first exhaust flow rate-variable device 32a on the basis of this control data.

In the present embodiment, the amount of exhaust from the polishing space 20 is managed and controlled in order to set the temperature of a predetermined location of the polishing space 20, for example, a surface of the polishing pad 14 to within a predetermined range. A solution, such as slurry, and pure water used to polish a wafer are adherent to the polishing surface of the polishing pad 14 of the CMP apparatus 10 in the present embodiment and a surface of the wafer to be polished mounted on the top ring 12. An endothermic reaction takes place when these liquids undergo a state change into gases and, by this endothermic reaction, heat can be removed from the polishing surface of polishing pad 14 and the surface of the wafer to be polished. The present invention can thus control the temperature of the predetermined location of the polishing space 20 to within the predetermined range by taking advantage of this phenomenon.

In the present invention, the state change of the abovementioned liquids into gases is facilitated by allowing air present in the polishing space 20 to absorb moisture, rather than providing an amount of heat in order to facilitate the state change of the abovementioned liquids into gases, i.e., rather than raising the temperature of the liquids to a boiling point to evaporate the liquids. If the polishing space 20 is kept sealed up without being exhausted (ventilated), the humidity of the space rises as the result of moisture from a solution, such as slurry, and pure water being contained in the air inside the polishing space 20. The amount of moisture contained in the air is not infinite, however. That is, there exist a limit (saturation) shown by a saturated vapor pressure curve dependent on the temperature and pressure of the ambient atmosphere. Accordingly, under the condition of the polishing space 20 being sealed up, the liquid-to-gas state change stops at an eventual point of time and is, consequently, a temporary transition.

Hence, in the present invention, air outside the polishing space 20 is drawn thereinto through the inlet 22a by managing and controlling the amount of exhaust from the polishing space 20. The drawn-in air is allowed to creep along (brought into contact with) the polishing surface of the polishing pad 14 and the surface of the wafer to be polished, and then discharged out of the outlet 24a. Consequently, it is possible to continuously cause a liquid-to-gas state change in the polishing space 20 to remove heat from the polishing surface of the polishing pad 14 and the surface of the wafer to be polished by means of the latent heat of vaporization.

In addition, since a wafer polishing process is generally carried out in accordance with a predetermined sequence, the amount of heat generated during polishing is reproducible for each polishing process. Accordingly, in the present embodiment, an exhaust flow rate necessary for the temperature of a predetermined location of the polishing space 20, for example, a surface of the polishing pad 14 to fall within a predetermined temperature range is previously calculated according to an axis of time from the start to end of polishing. Then, the exhaust control unit 33 controls the first exhaust flow rate-variable device 32a, so that the exhaust flow rate of the first exhaust line 31a equals this calculated exhaust flow rate.

Figure 2:
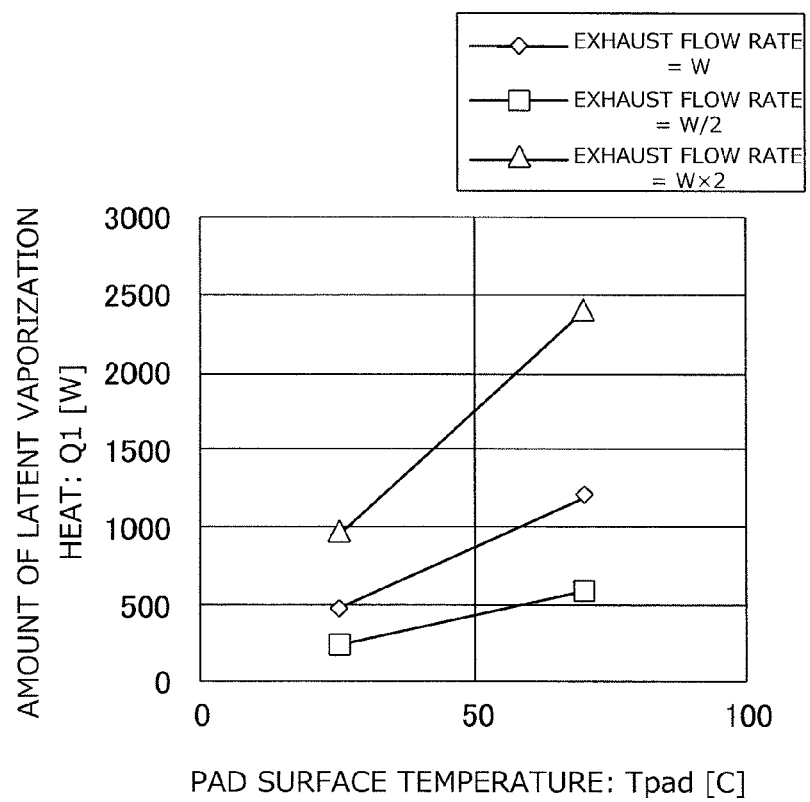
FIG. 2 is a graph illustrating the relationship between the polishing surface temperature of a polishing pad and the amount of latent vaporization heat for each exhaust flow rate.

FIG. 2 is a graph illustrating the relationship between the polishing surface temperature of a polishing pad 14 and the amount of latent vaporization heat for each exhaust flow rate in the substrate processing apparatus 1 illustrated in FIG. 1. The axis of abscissas of this graph represents the polishing surface temperature (° C.) of the polishing pad 14, whereas the axis of ordinates represents the amount of latent vaporization heat (W) at each exhaust flow rate.

As illustrated in the figure, this graph shows the temperature of the polishing surface of the polishing pad 14 and the amount of latent vaporization heat when the exhaust flow rates are [W], [2W] and [W/2]. According to this graph, the amount of latent vaporization heat tends to be larger with an increase in the exhaust flow rate. This indicates that air more abundantly passes through the polishing surface of the polishing pad 14 with an increase in the exhaust flow rate, and therefore, a solution, such as slurry, and the moisture of pure water adherent to the polishing surface and a wafer surface tend to undergo a state change into gases, with the result that the amount of latent vaporization heat increases and the amount of heat removed from the polishing surface increases as well. As described above, the temperature of the polishing space 20 hardly lowers even if the exhaust flow rate is increased. It is thus possible to intensively remove heat from locations to which the solution and pure water are adherent. Note that Pa·m3/s, sccm (standard cc/min) or the like, though not specifically shown here, can be used as the unit of exhaust flow rates.

Figure 3:
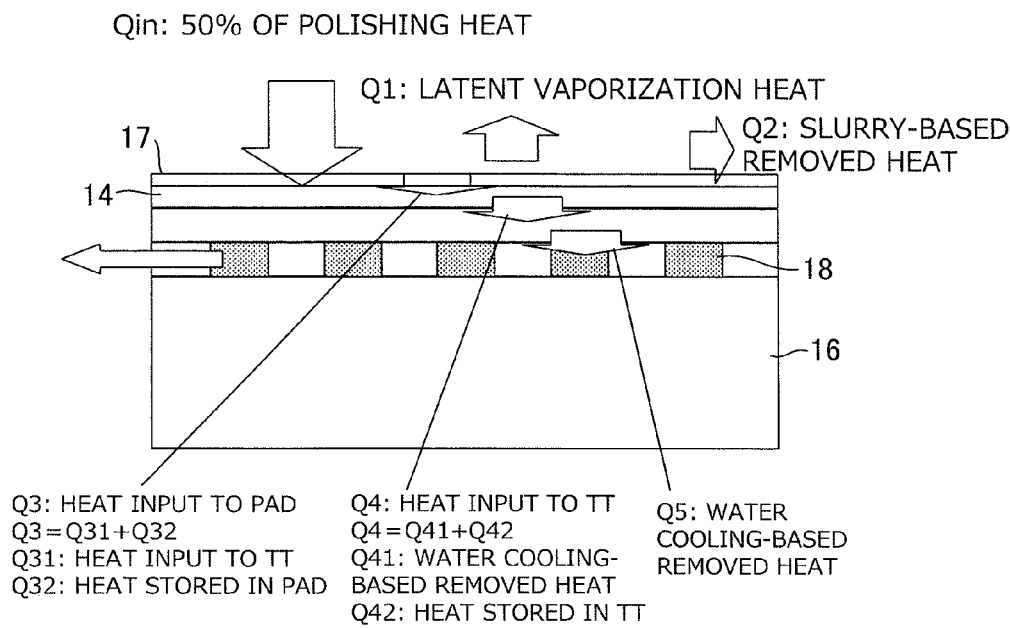
FIG. 3 is a schematic view illustrating a heat input/output model of the polishing surface of a polishing pad.

Next, a description will be made of a heat input/output model of the polishing surface of the polishing pad 14 and examples of heat input/output calculations in this model. FIG. 3 is a schematic view illustrating a heat input/output model of the polishing surface of the polishing pad 14 illustrated in FIG. 1. As illustrated in the figure, the polishing pad 14 is attached onto a polishing table 16, and a surface liquid film 17 of slurry or the like is formed on the polishing pad 14. A cooling unit 18 for water-cooling the polishing table 16 from therewithin is disposed inside the polishing table 16. In such a configuration as described above, part (50% in this example of a model) of polishing heat is input to the polishing pad 14 and the slurry (Qin) when a wafer held by the top ring 12 illustrated in FIG. 1 is polished by the polishing pad 14. Removed heat (Q2) resulting from cooling by the slurry and latent vaporization heat (Q1) resulting from the evaporation of the slurry cause differential heat (Q3) resulting from the subtraction of the slurry-based removed heat (Q2) and the latent vaporization heat (Q1) from 50% of polishing heat to be input to the polishing pad 14.

Part (Q32) of the heat (Q3) input to the polishing pad 14 is stored in the polishing pad 14, and the rest (Q31 and Q4) is input to the polishing table 16. Part (Q42) of the heat (Q31 and Q4) input to the polishing table 16 is stored in the polishing table 16, and the rest (Q41 and Q5) is removed by the cooling unit 18.

Figure 4:
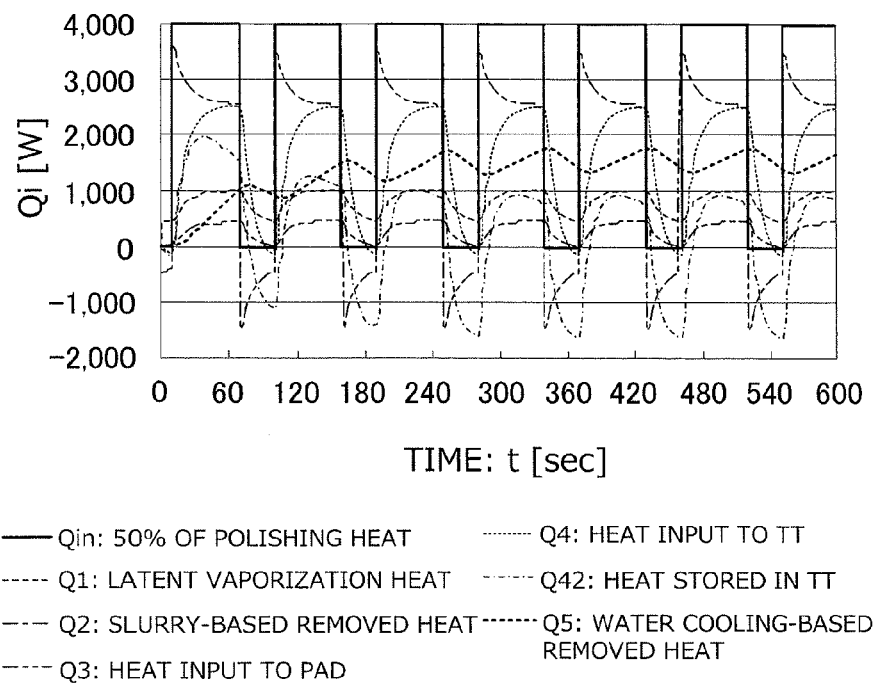
FIG. 4 is a graph illustrating a change in each amount of heat discussed in the heat input/output model.

FIG. 4 is a graph illustrating a change in each amount of heat discussed in the heat input/output model illustrated in FIG. 3. In the present embodiment, a polishing process is carried out intermittently for each wafer to be polished. Accordingly, as illustrated in the figure, the graph showing 50% (Qin) of polishing heat generated due to polishing exhibits an intermittent behavior. As discussed in the model of FIG. 3, the amount of heat input (Q3) of the polishing pad 14 is affected by the latent vaporization heat (Q1) and the slurry-based removed heat (Q2). That is, the amount of heat input (Q3) of the polishing pad 14 decreases as the latent vaporization heat (Q1) increases. In the present invention, the amount of heat input (Q3) of the polishing pad 14 is suppressed by increasing this latent vaporization heat (Q1), thereby making it possible to suppress a temperature rise in the polishing pad 14.

Figure 5A:
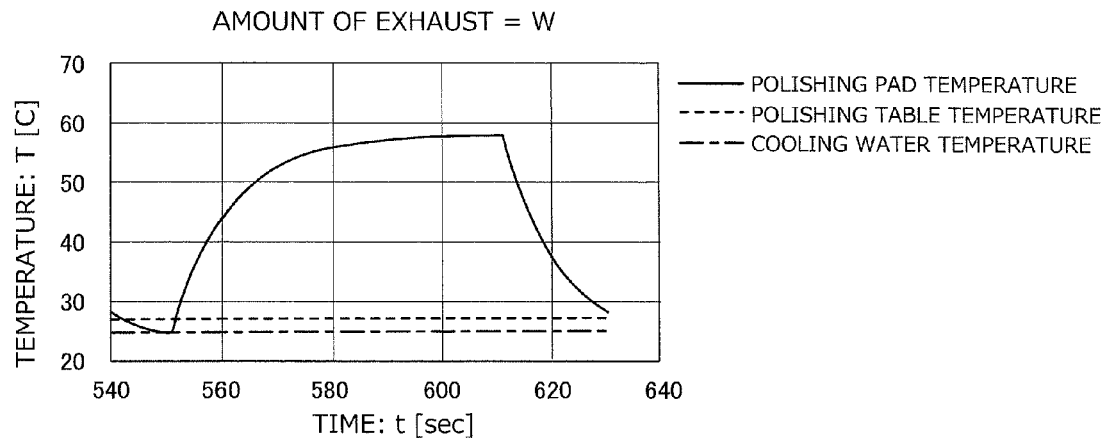
FIGS. 5A to 5C are graphs illustrating temperature transitions in a polishing pad in a polishing process.
Figure 5B:
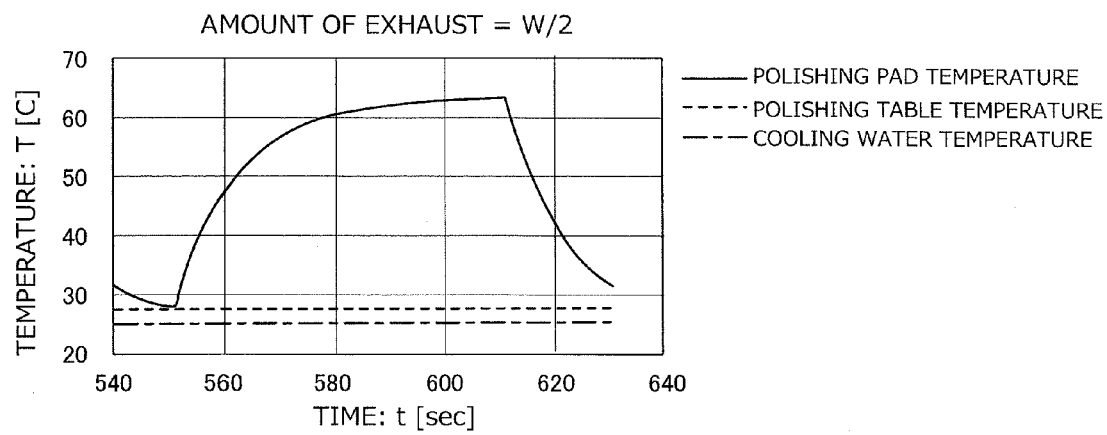
Figure 5C:
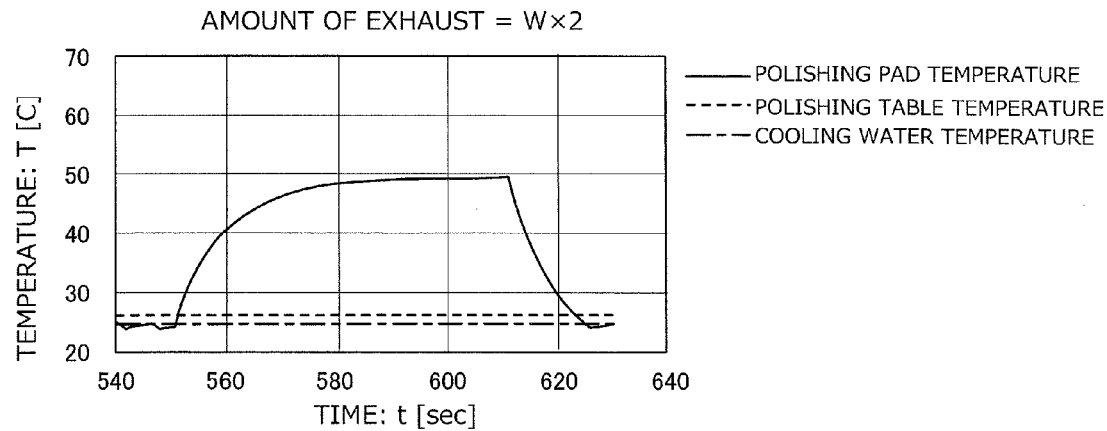

FIGS. 5A to 5C are graphs illustrating temperature transitions in the polishing pad 14 according to the present embodiment in a polishing process, wherein FIG. 5A is a graph illustrating a temperature transition when the exhaust flow rate of the first exhaust line 31a is W, FIG. 5B is a graph illustrating a temperature transition when the exhaust flow rate of the first exhaust line 31a is W/2, and FIG. 5C is a graph illustrating a temperature transition when the exhaust flow rate of the first exhaust line 31a is 2W.

Comparison between FIG. 5A and FIG. 5B reveals that if the exhaust flow rate is halved, i.e., W/2, for an exhaust flow rate of W, the temperature of the polishing pad 14 is as relatively high as above 60° C. The possible reason for this is that the amount of latent vaporization heat of slurry and the like decreases as the result of the exhaust flow rate being halved, thus causing an increase in the amount of heat input to the polishing pad 14.

Comparison between FIG. 5A and FIG. 5C reveals that if the exhaust flow rate is doubled, i.e., 2W, for an exhaust flow rate of W, the temperature of the polishing pad 14 is as relatively low as approximately 50° C. The possible reason for this is that the amount of latent vaporization heat of slurry and the like increases as the result of the exhaust flow rate being doubled, thus causing a decrease in the amount of heat input to the polishing pad 14.

As described above, the substrate processing apparatus 1 according to the present embodiment can remove heat from the polishing pad 14, the slurry spread over the polishing surface of the pad, and the top ring 12 holding the wafer by controlling the exhaust flow rate of the polishing space 20 and utilizing a phenomenon of latent vaporization heat, without incurring problems inherent in a conventional thermal contact conductance method or dry gas spray method, and manage and control the temperature of these constituent elements so that the temperature falls within a predetermined temperature range. In consequence, it is possible to obtain an excellent degree of planarity of the polished surface of a wafer and realize a polishing process in a temperature region in which the performance of slurry can be delivered. It is also possible to improve the productivity of the CMP apparatus 10.

Figure 6:
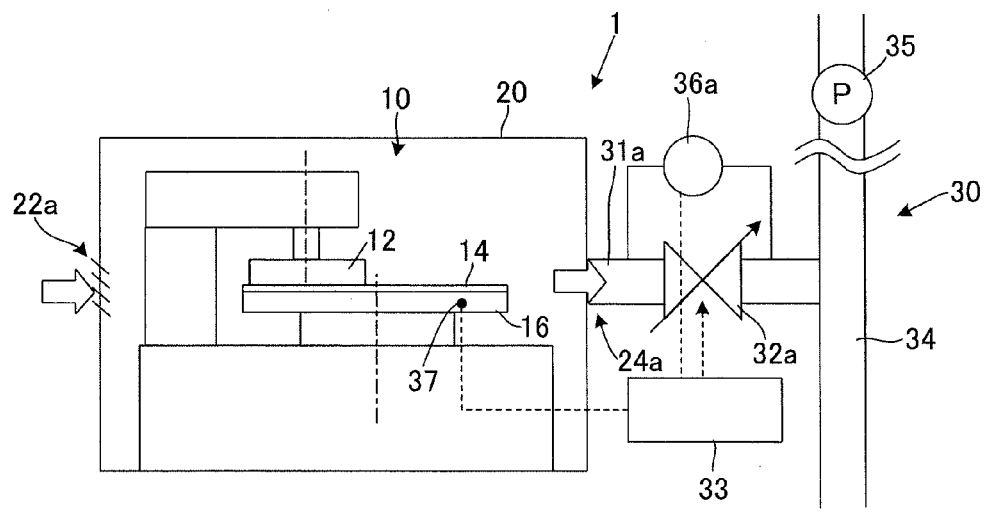
FIG. 6 is a schematic view illustrating an exhaust flow rate control apparatus according to another embodiment and a substrate processing apparatus provided therewith.

Next, a description will be made of an exhaust flow rate control apparatus according to another embodiment of the present invention and a substrate processing apparatus provided therewith. FIG. 6 is a schematic view illustrating the exhaust flow rate control apparatus according to another embodiment of the present invention and the substrate processing apparatus provided therewith. As illustrated in the figure, an exhaust flow rate control apparatus 30 according to the present embodiment includes a differential-pressure meter 36a in the first exhaust line 31a. The differential-pressure meter 36a is configured to be capable of measuring the pressure difference between an upstream position and a downstream position of the first exhaust flow rate-variable device 32a in the first exhaust line 31a. The differential-pressure meter 36a is configured to be capable of communicating with the exhaust control unit 33, so that the exhaust control unit 33 can receive data on the measured pressure difference.

The CMP apparatus 10 includes a temperature sensor 37 capable of measuring the temperature of the polishing pad 14 inside the polishing table 16. Note that this temperature sensor 37 may be, for example, a non-contact temperature sensor, and is not limited in location where the temperature sensor 37 is disposed. The temperature sensor 37 is configured to be capable of communicating with the exhaust control unit 33, so that the exhaust control unit 33 can receive the measured temperature of the polishing pad 14.

Since being provided with the temperature sensor 37, the substrate processing apparatus 1 in the present embodiment can control the exhaust flow rate of the first exhaust line 31a on the basis of the temperature of the polishing pad 14 measured with the temperature sensor 37. That is, data on the temperature of the polishing pad 14 detected with the temperature sensor 37 is received by the exhaust control unit 33. If the temperature is above a predetermined (desired) temperature range, the exhaust control unit 33 controls the first exhaust flow rate-variable device 32a, so that the exhaust flow rate of the first exhaust line 31a increases. On the other hand, if the temperature of the polishing pad 14 detected with the temperature sensor 37 is below the predetermined temperature range, the exhaust control unit 33 controls the first exhaust flow rate-variable device 32a, so that the exhaust flow rate of the first exhaust line 31a decreases.

Alternatively, the exhaust control unit 33 may calculate an exhaust flow rate necessary for the temperature of the polishing pad 14 to fall within the predetermined temperature range from the temperature of the polishing pad 14 detected with the temperature sensor 37, and may control the first exhaust flow rate-variable device 32a to achieve that exhaust flow rate. In this case, a calculating formula for calculating an exhaust flow rate at which the temperature of the polishing pad 14 can be set to within the predetermined temperature range is previously determined by experiment or the like. Then, the first exhaust flow rate-variable device 32a is controlled to achieve the exhaust flow rate calculated on the basis of this calculating formula.

Since being further provided with the differential-pressure meter 36a, the substrate processing apparatus 1 in the present embodiment can measure the exhaust flow rate of the first exhaust line 31a. Accordingly, the exhaust control unit 33 can control the first exhaust flow rate-variable device 32a on the basis of the measured exhaust flow rate, so that the flow rate equals the exhaust flow rate calculated on the basis of the abovementioned temperature.

The flow rate of exhaust from the polishing space 20 in the first exhaust line 31a can be measured in the following way. That is, the pressure difference between upstream and downstream positions of the first exhaust flow rate-variable device 32a is measured by the differential-pressure meter 36a. The exhaust flow rate of the first exhaust line 31a is calculated from an actually-measured pressure difference by the exhaust control unit 33 on the basis of a previously-determined relational expression composed of a pressure difference and an exhaust flow rate. Note that the pressure of the downstream position of the first exhaust flow rate-variable device 32a is highly negative, compared with the pressure of the upstream position. Only the pressure of the upstream position may therefore be measured, assuming that the pressure of the downstream position is zero, and the exhaust flow rate may be calculated from the measured value. Accordingly, in the present embodiment, the flow rate-measuring device is configured with the differential-pressure meter 36a and the exhaust control unit 33.

In the present embodiment, the differential-pressure meter 36a is used to measure (calculate) the exhaust flow rate. Without limitation to this method, however, a flow velocimeter, for example, may be used instead. In cases where a flow velocimeter is used, the exhaust flow rate can be evaluated from the product of a measured flow velocity and the piping cross-sectional area of the first exhaust line 31a by disposing the flow velocimeter on the first exhaust line 31a.

By monitoring the exhaust flow rate evaluated as described above, the exhaust control unit 33 can improve the accuracy of control of the first exhaust flow rate-variable device 32a, so that the evaluated flow rate equals the exhaust flow rate calculated on the basis of the abovementioned temperature.

As described above, the substrate processing apparatus 1 according to the present embodiment can remove heat from the polishing pad 14, the slurry spread over the polishing surface of the pad, and the top ring 12 holding the wafer by controlling the exhaust flow rate of the polishing space 20 and utilizing a phenomenon of latent vaporization heat, without incurring problems inherent in a conventional thermal contact conductance method or dry gas spray method, and manage and control the temperature of these constituent elements, so that the temperature falls within a certain temperature range. In consequence, it is possible to obtain an excellent degree of planarity of the polished surface of a wafer and realize a polishing process in a temperature region in which the performance of slurry can be delivered. It is also possible to improve the productivity of the CMP apparatus 10.

In addition, since being provided with the temperature sensor 37, the substrate processing apparatus 1 according to the present embodiment can measure the temperature of a predetermined location (for example, the polishing pad 14 in the present embodiment) inside the polishing space 20 with the temperature sensor 37, and can control the flow rate of exhaust from the polishing space 20, so that the temperature falls within a predetermined temperature range.

Yet additionally, since being provided with the flow rate-measuring device configured with the differential-pressure meter 36a and the exhaust control unit 33, the substrate processing apparatus 1 according to the present embodiment can improve the accuracy of control performed to set the flow rate of exhaust from polishing space 20 to a desired exhaust flow rate.

Note that although the substrate processing apparatus 1 according to the present embodiment has been described as being provided with the differential-pressure meter 36a, the apparatus may not include the differential-pressure meter 36a. Alternatively, the relationship between the degree of valve opening of an exhaust damper constituting the first exhaust flow rate-variable device 32a and the exhaust flow rate is determined by experiment or the like to enable the exhaust control unit 33 to control the degree of valve opening on the basis of this relationship, so that the exhaust flow rate of the first exhaust line 31a equals a desired exhaust flow rate.

Figure 7:
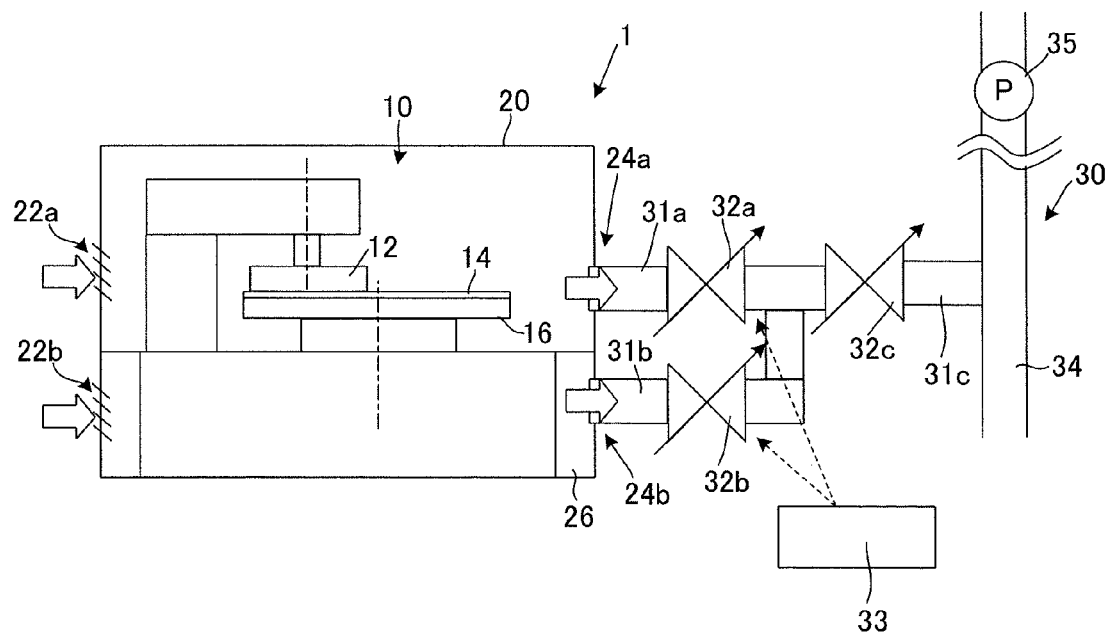
FIG. 7 is a schematic view illustrating an exhaust flow rate control apparatus according to yet another embodiment and a substrate processing apparatus provided therewith.

FIG. 7 is a schematic view illustrating an exhaust flow rate control apparatus according to yet another embodiment of present invention and a substrate processing apparatus provided therewith. As illustrated in the figure, a substrate processing apparatus 1 according to the present embodiment includes another space 26 separated in atmosphere from the polishing space 20. Air is drawn into the other space 26 from the inlet 22b and discharged out of the outlet 24b.

An exhaust flow rate control apparatus 30 according to the present embodiment is provided with a second exhaust line 31b connected to the outlet 24b to exhaust the other space 26; and a second exhaust flow rate-variable device 32b capable of adjusting the exhaust flow rate of the second exhaust line 31b and composed of an exhaust damper and the like. The upstream end of the second exhaust line 31b is connected to the outlet 24b, and the downstream end of the second exhaust line 31b is connected to the downstream side of the first exhaust line 31a. A third exhaust line 31c is connected to the connection point between the first exhaust line 31a and the second exhaust line 31b, and a third exhaust flow rate-variable device 32c is disposed on this third exhaust line 31c. Accordingly, the exhaust device 35 is configured to be capable of exhausting the other space 26 through the third exhaust line 31c and the second exhaust line 31b.

The exhaust control unit 33 is configured to be capable of communicating with the first exhaust flow rate-variable device 32a and the second exhaust flow rate-variable device 32b including, for example, servomotors and the like. In addition, the exhaust control unit 33 includes a storage device storing control data on previously-calculated exhaust flow rates necessary to set the temperature of a predetermined location of the CMP apparatus 10, for example, a surface of the polishing pad 14 to within a certain range, and controls the first exhaust flow rate-variable device 32a and the second exhaust flow rate-variable device 32b on the basis of this control data.

In general, the factory exhaust line 34 in a semiconductor manufacturing plant or the like discharges emissions from the plant at a constant exhaust flow rate. Accordingly, if the flow rates of exhaust from the first exhaust line 31a and the second exhaust line 31b are variable, the flow rates may affect the factory exhaust line 34 and other semiconductor manufacturing equipment. Hence, in the substrate processing apparatus 1 of the present embodiment, the first exhaust flow rate-variable device 32a and the second exhaust flow rate-variable device 32b are controlled so that the flow rate of exhaust from the substrate processing apparatus 1 is constant. That is, in the present embodiment, the exhaust control unit 33 controls the first exhaust flow rate-variable device 32a and the second exhaust flow rate-variable device 32b on the basis of the abovementioned control data on the previously-calculated exhaust flow rates, so that the sum of the flow rate of exhaust from the polishing space 20 in the first exhaust line 31a and the flow rate of exhaust from the other space 26 in the second exhaust line 31b is constant.

In addition, in the present embodiment, an exhaust flow rate can be controlled by the third exhaust flow rate-variable device 32c to ensure that the exhaust flow rate of the third exhaust line 31c where emissions discharged from the first exhaust line 31a and the second exhaust line 31b join together is constant.

As described above, according to the substrate processing apparatus 1 of the present embodiment, the exhaust flow rate of the first exhaust line 31a can be controlled so that the temperature of a predetermined location of the CMP apparatus 10, for example, a surface of the polishing pad 14 is constant. In addition, since the substrate processing apparatus 1 as a whole is exhausted at a constant exhaust flow rate, it is possible to suppress adverse effects on the factory exhaust line 34 and other semiconductor manufacturing equipment.

Note that the third exhaust flow rate-variable device 32c is arranged to stabilize the exhaust flow rate. Accordingly, the advantageous effects of the present invention can still be achieved without this device. In addition, the third exhaust flow rate-variable device 32c may be configured to be controllable by the exhaust control unit 33.

Figure 8:
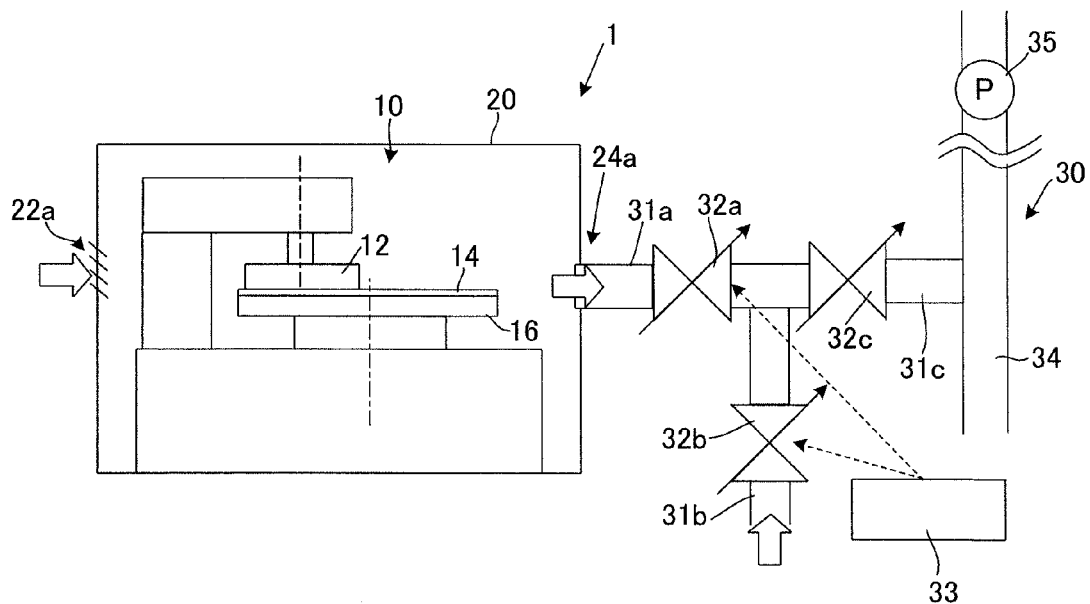
FIG. 8 is a schematic view illustrating an exhaust flow rate control apparatus according to still another embodiment and a substrate processing apparatus provided therewith.

Yet additionally, the other space 26 may be an additional space, such as a clean room, as illustrated in, for example, FIG. 8, and may be anywhere as long as the space is separated in atmosphere from the polishing space 20. FIG. 8 is a schematic view illustrating an exhaust flow rate control apparatus in which the second exhaust line 31b is configured to exhaust another space, and a substrate processing apparatus provided with the exhaust flow rate control apparatus. As illustrated in the figure, the substrate processing apparatus 1 is configured so that the second exhaust line 31b discharges emissions from another space separated in atmosphere from the polishing space 20, for example, from a clean room. This way of configuration eliminates the need to dispose the inlet 22b, the outlet 24b and the other space 26 illustrated in FIG. 7 in the CMP apparatus 10. Consequently, it is possible to simplify the configuration of the CMP apparatus 10 and reduce costs and efforts.

Figure 9:
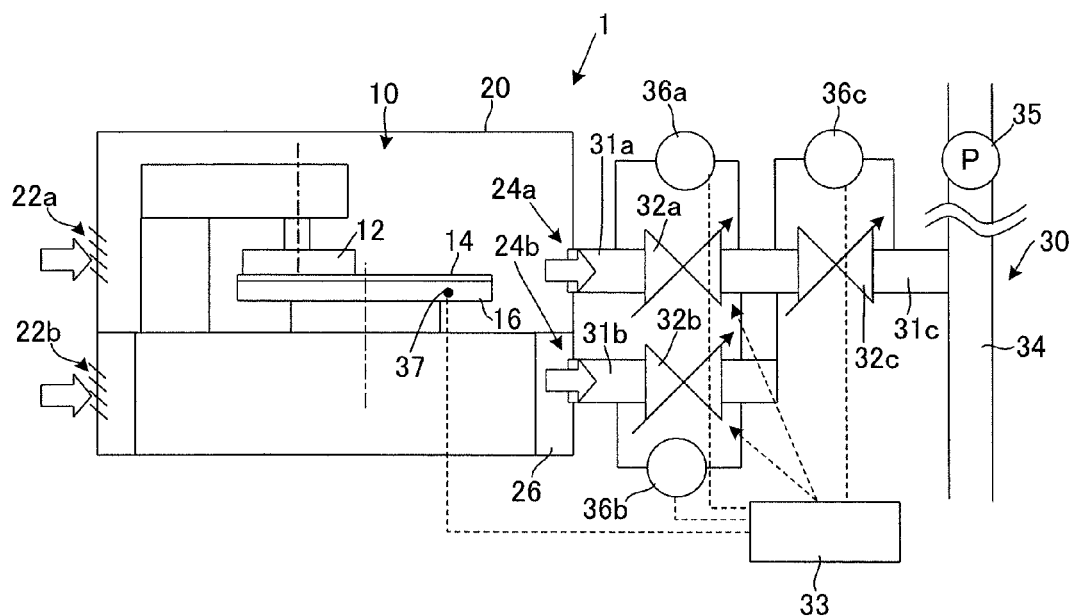
FIG. 9 is a schematic view illustrating an exhaust flow rate control apparatus according to still another embodiment and a substrate processing apparatus provided therewith.

FIG. 9 is a schematic view illustrating an exhaust flow rate control apparatus according to still another embodiment of the present invention and a substrate processing apparatus provided therewith. As illustrated in the figure, an exhaust flow rate control apparatus 30 according to the present embodiment is provided with a differential-pressure meter 36a in a first exhaust line 31a, a differential-pressure meter 36b in a second exhaust line 31b, and a differential-pressure meter 36c in a third exhaust line 31c. The differential-pressure meter 36a is configured to be capable of measuring the pressure difference between upstream and downstream positions of the first exhaust flow rate-variable device 32a in the first exhaust line 31a. Likewise, the differential-pressure meter 36b is configured to be capable of measuring the pressure difference between upstream and downstream positions of the second exhaust flow rate-variable device 32b in the second exhaust line 31b. Yet likewise, the differential-pressure meter 36c is configured to be capable of measuring the pressure difference between upstream and downstream positions of the third exhaust flow rate-variable device 32c in the third exhaust line 31c. The respective differential-pressure meters 36a, 36b and 36c are configured to be capable of communicating with the exhaust control unit 33, so that the exhaust control unit 33 can receive data on measured pressure differences.

In the substrate processing apparatus 1 of the present embodiment, the first exhaust flow rate-variable device 32a and the second exhaust flow rate-variable device 32b are controlled so that the flow rate of emissions discharged from the substrate processing apparatus 1 is constant. That is, in the present embodiment, the exhaust control unit 33 controls the first exhaust flow rate-variable device 32a and the second exhaust flow rate-variable device 32b on the basis of the abovementioned control data on previously-calculated exhaust flow rates, so that the sum of the flow rate of exhaust from polishing space 20 in the first exhaust line 31a and the flow rate of exhaust from the other space 26 in the second exhaust line 31b is constant.

In addition, in the present embodiment, an exhaust flow rate can be controlled by the third exhaust flow rate-variable device 32c to ensure that the exhaust flow rate of the third exhaust line 31c where emissions discharged from the first exhaust line 31a and the second exhaust line 31b join together is constant.

Since being provided with the temperature sensor 37, the substrate processing apparatus 1 of the present embodiment can control the exhaust flow rate of the first exhaust line 31a on the basis of the temperature of the polishing pad 14 measured with the temperature sensor 37, as in the embodiment illustrated in FIG. 6. Alternatively, the exhaust control unit 33 can calculate an exhaust flow rate necessary to set the temperature of the polishing pad 14 to within a predetermined temperature range from the temperature of the polishing pad 14 detected with the temperature sensor 37, and control the first exhaust flow rate-variable device 32a, so as to achieve that exhaust flow rate.

Here, since being provided with the differential-pressure meters 36a and 36b in the present embodiment, the exhaust flow rate control apparatus 30 can measure the exhaust flow rates of the first exhaust line 31a and the second exhaust line 31b. Accordingly, the exhaust control unit 33 can control the first exhaust flow rate-variable device 32a and the second exhaust flow rate-variable device 32b on the basis of the measured exhaust flow rates, so that the measured exhaust flow rates equal the exhaust flow rates calculated on the basis of the abovementioned temperature. Note that in the present embodiment, the differential-pressure meters 36a, 36b and 36c are used to measure (calculate) exhaust flow rates. Without limitation to this method, however, flow velocimeters, for example, may be used instead.

Since being further provided with the differential-pressure meter 36c in the present embodiment, the exhaust flow rate control apparatus 30 can measure the reference pressure of the third exhaust line 31c to ensure that the exhaust flow rate of the third exhaust line 31c is constant.

As described above, according to the substrate processing apparatus 1 in accordance with the present embodiment, it is possible to remove heat from the polishing pad 14, the slurry spread over the polishing surface of the pad, and the top ring 12 holding the wafer by controlling the exhaust flow rate of the polishing space 20 and utilizing a phenomenon of latent vaporization heat, without incurring problems inherent in a conventional thermal contact conductance method or dry gas spray method, and manage and control the temperature of these constituent elements, so that the temperature falls within a certain temperature range. In consequence, it is possible to obtain an excellent degree of planarity of the polished surface of a wafer and realize a polishing process in a temperature region in which the performance of slurry can be delivered. It is also possible to improve the productivity of the CMP apparatus 10.

Since being provided with the temperature sensor 37, the substrate processing apparatus 1 according to the present embodiment can measure the temperature of a predetermined location (for example, the polishing pad 14 in the present embodiment) inside the polishing space 20 with the temperature sensor 37, and can control the flow rate of exhaust from the polishing space 20, so that the temperature falls within a predetermined temperature range.

The substrate processing apparatus 1 of the present embodiment can control the exhaust flow rate of the first exhaust line 31a, so that the temperature of a predetermined location of the CMP apparatus 10, for example, a surface of the polishing pad 14 is constant. In addition, since the substrate processing apparatus 1 as a whole is exhausted at a constant exhaust flow rate, it is possible to suppress adverse effects on the factory exhaust line 34 and other semiconductor manufacturing equipment. Yet additionally, since being provided with the differential-pressure meters 36a, 36b and 36c, the substrate processing apparatus 1 can improve the accuracy of control performed to set the flow rate of exhaust from polishing space 20 to a desired exhaust flow rate, as well as the accuracy of control performed to maintain the exhaust flow rate of the substrate processing apparatus 1 as a whole constant.

Figure 10:
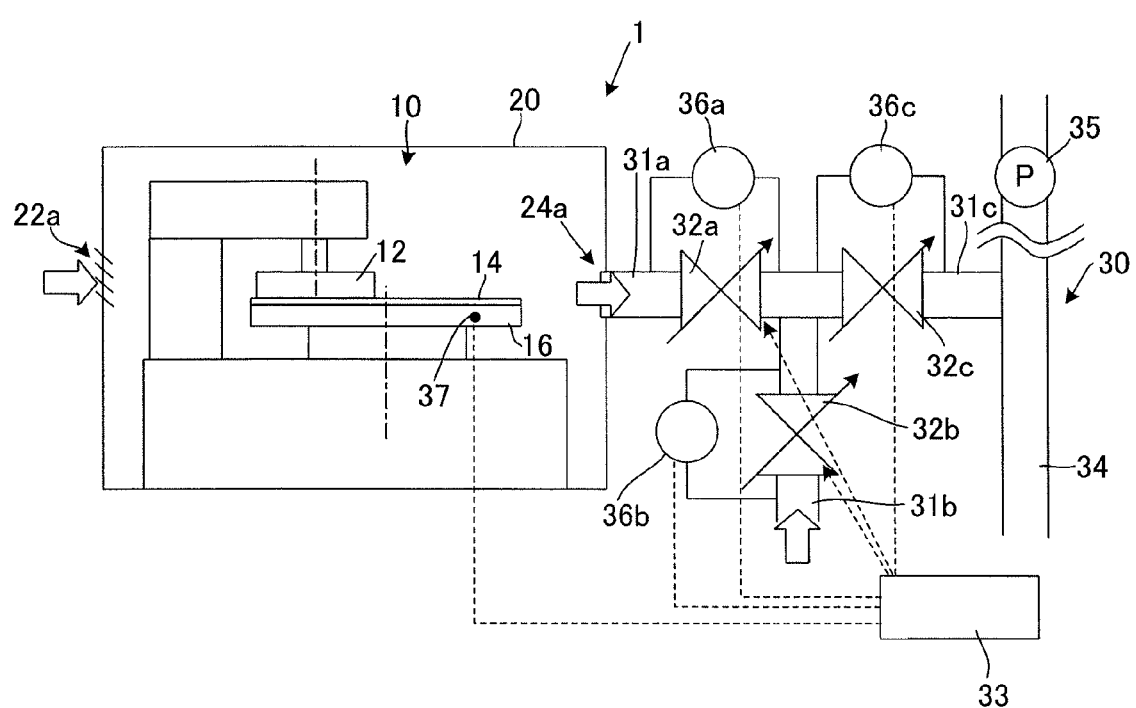
FIG. 10 is a schematic view illustrating an exhaust flow rate control apparatus according to still another embodiment and a substrate processing apparatus provided therewith.

Note that the other space 26 may be an additional space, such as a clean room, as illustrated in, for example, FIG. 10, and may be located anywhere as long as the space is separated in atmosphere from the polishing space 20. FIG. 10 is a schematic view illustrating an exhaust flow rate control apparatus in which the second exhaust line 31b is configured to exhaust another space, and a substrate processing apparatus provided with the exhaust flow rate control apparatus. As illustrated in the figure, the substrate processing apparatus 1 is configured in the same way as the substrate processing apparatus 1 illustrated in FIG. 8, so that the second exhaust line 31b discharges emissions from another space separated in atmosphere from the polishing space 20, for example, a clean room. This way of configuration eliminates the need to dispose the inlet 22b, the outlet 24b and the other space 26 illustrated in FIG. 9 in the CMP apparatus 10. Consequently, it is possible to simplify the configuration of the CMP apparatus 10 and reduce costs and efforts.

While the embodiments of the present invention have been described heretofore, the present invention is not limited to the above-described embodiments, but may be modified in various ways within the scope of the appended claims and the technical idea recited in the specification and the accompanying drawings. It should be noted that any shapes and materials not directly described in the specification and the accompanying drawings fall within the scope of the technical idea of the present invention, as long as such shapes and materials have the actions and effects of the present invention. For example, although an apparatus provided with the CMP apparatus 10 has been described as the substrate processing apparatus in the present embodiment, the present invention is not limited to the CMP apparatus 10 but may be applied to other substrate processing apparatuses.

REFERENCE SIGNS LIST

1: substrate processing apparatus, 10: CMP apparatus, 12: top ring, 14: polishing pad, 16: polishing table, 17: surface liquid film, 18: cooling unit, 20: polishing space, 22a: inlet, 22b: inlet, 24a: outlet, 24b: outlet, 26: another space, 30: exhaust flow rate control apparatus, 31a: first exhaust line, 31b: second exhaust line, 31c: third exhaust line, 32a: first exhaust flow rate-variable device, 32b: second exhaust flow rate-variable device, 32c: third exhaust flow rate-variable device, 33: exhaust control unit, 34: factory exhaust line, 35: exhaust device, 36a: differential-pressure meter, 36b: differential-pressure meter, and 36c: differential-pressure meter.

What is claimed is:

1. An exhaust flow rate control apparatus comprising:
   an exhaust device configured to be capable of exhausting a processing space in which a substrate processing apparatus is disposed;
   a first exhaust flow rate-variable device capable of adjusting a flow rate of exhaust from the processing space; and
   a control device configured to adjust an amount of latent vaporization heat at a predetermined location inside the processing space by controlling the first exhaust flow rate-variable device, so that a temperature of the predetermined location inside the processing space falls within a predetermined temperature range.

2. The exhaust flow rate control apparatus according to claim 1, further comprising a temperature-measuring device for measuring the temperature of the predetermined location inside the processing space,
   wherein the control device calculates an exhaust flow rate necessary for the temperature of the predetermined location inside the processing space to fall within the predetermined temperature range on the basis of the measured temperature, and controls the first exhaust flow rate-variable device to achieve the calculated exhaust flow rate.

3. The exhaust flow rate control apparatus according to claim 2, further comprising a flow rate-measuring device for measuring the flow rate of exhaust from the processing space,
   wherein the control device controls the first exhaust flow rate-variable device on the basis of the measured exhaust flow rate to achieve the calculated exhaust flow rate.

4. The exhaust flow rate control apparatus according to claim 1, wherein the control device includes a storage device storing control data on previously-calculated exhaust flow rates necessary for the temperature of the predetermined location to fall within the predetermined temperature range, and controls the first exhaust flow rate-variable device on the basis of the control data.

5. The exhaust flow rate control apparatus according to claim 1, further comprising:
   a first exhaust line connected to the processing space;
   a second exhaust line connected to a space other than the processing space;
   a second exhaust flow rate-variable device provided on the second exhaust line and capable of adjusting a flow rate of exhaust from the space other than the processing space,
   wherein the first exhaust flow rate-variable device is provided on the first exhaust line,
   an upstream end of the second exhaust line is connected to the space other than the processing space,
   a downstream end of the second exhaust line is connected to the first exhaust line downstream of the first exhaust flow rate-variable device, and
   the exhaust device is configured to be capable of exhausting the other space and controls the first exhaust flow rate-variable device and the second exhaust flow rate-variable device, so that a sum of the flow rate of exhaust from the processing space and the flow rate of exhaust from the other space is constant.

6. A substrate processing apparatus comprising:
   an exhaust flow rate control apparatus comprising:
      an exhaust device configured to be capable of exhausting a processing space in which a substrate processing apparatus is disposed;
      a first exhaust flow rate-variable device capable of adjusting a flow rate of exhaust from the processing space; and
      a control device configured to adjust an amount of latent vaporization heat at a predetermined location inside the processing space by controlling the first exhaust flow rate-variable device, so that a temperature of the predetermined location inside the processing space falls within a predetermined temperature range.

7. The substrate processing apparatus according to claim 6 further comprising:
   a polishing table in the processing space configured to support the polishing pad,
   wherein the control device of the exhaust flow rate control apparatus is configured to adjust an amount of latent vaporization heat on a polishing pad by controlling the first exhaust flow rate-variable device, so that a temperature on the polishing pad falls within a predetermined temperature range and the substrate processing apparatus is a CMP apparatus.

\* \* \* \* \*